US008354634B2

(12) United States Patent
Green et al.

(10) Patent No.: US 8,354,634 B2
(45) Date of Patent: Jan. 15, 2013

(54) MASS SPECTROMETER

(75) Inventors: Martin Green, Cheshire (GB); Steven Derek Pringle, Darwen (GB); Jason Lee Wildgoose, Stockport (GB)

(73) Assignee: Micromass UK Limited, Manchester (GB)

( * ) Notice: Subject to any disclaimer, the term of this patent is extended or adjusted under 35 U.S.C. 154(b) by 402 days.

(21) Appl. No.: 12/601,094

(22) PCT Filed: May 22, 2008

(86) PCT No.: PCT/GB2008/001756
§ 371 (c)(1),
(2), (4) Date: Apr. 9, 2010

(87) PCT Pub. No.: WO2008/142418
PCT Pub. Date: Nov. 27, 2008

(65) Prior Publication Data

US 2010/0213361 A1 Aug. 26, 2010

Related U.S. Application Data

(60) Provisional application No. 60/946,211, filed on Jun. 26, 2007.

(30) Foreign Application Priority Data

May 22, 2007 (GB) .................................. 0709799.1

(51) Int. Cl.
*B01D 59/44* (2006.01)
*H01J 49/00* (2006.01)

(52) U.S. Cl. ..................... 250/281; 250/252.1; 250/282; 250/283; 250/286; 250/287; 250/288; 250/289; 250/290; 250/291; 250/292; 702/22; 702/26; 702/27; 702/28

(58) Field of Classification Search ............... 250/252.1, 250/281–283, 286–292; 702/22, 26–28
See application file for complete search history.

(56) References Cited

U.S. PATENT DOCUMENTS 4,490,806 A 12/1984 Enke et al.
(Continued)

FOREIGN PATENT DOCUMENTS

GB 2390936 1/2004
(Continued)

OTHER PUBLICATIONS

Notification of Reason(s) for Rejection for Japanese Patent Application 2010-508903, dated Aug. 2, 2011.

*Primary Examiner* — Jack Berman
*Assistant Examiner* — Meenakshi Sahu
(74) *Attorney, Agent, or Firm* — Diederiks & Whitelaw, PLC

(57) ABSTRACT

A mass spectrometer is disclosed wherein an ion signal is split into a first and second signal. The first and second signals are multiplied by different gains and are digitised. Arrival time and intensity pairs are calculated for both digitised signals and the resulting time and intensity pairs are combined to form a high dynamic range spectrum. The spectrum is then combined with other corresponding spectra to form a summed spectrum.

15 Claims, 6 Drawing Sheets

U.S. PATENT DOCUMENTS

| | | | |
|---|---|---|---|
| 6,259,101 | B1 | 7/2001 | Wesler et al. |
| 7,038,197 | B2 * | 5/2006 | Bateman et al. .............. 250/281 |
| 2002/0175292 | A1 | 11/2002 | Whitehouse et al. |
| 2005/0145788 | A1 | 7/2005 | Davis et al. |
| 2006/0000982 | A1 | 1/2006 | Keller et al. |
| 2006/0020400 | A1 * | 1/2006 | Okamura et al. ............... 702/22 |
| 2007/0268171 | A1 | 11/2007 | Hidalgo et al. |

FOREIGN PATENT DOCUMENTS

| | | |
|---|---|---|
| GB | 2429110 | 2/2007 |
| JP | 57060654 | 4/1982 |
| JP | 61-207962 | 9/1986 |
| JP | 09-184823 | 7/1997 |
| WO | 98/26095 | 6/1998 |
| WO | 2006007589 | 1/2006 |
| WO | 2008/008867 | 1/2008 |

* cited by examiner

MASS SPECTROMETER

CROSS REFERENCE TO RELATED APPLICATIONS

This application is the National Stage of International Application No. PCT/GB2008/001756, filed May 22, 2008, which claims priority to and benefit of United Kingdom Patent Application No. 0709799.1, filed May 22, 2007, and U.S. Provisional Patent Application Ser. No. 601946,211, filed Jun. 26, 2007. The entire contents of these applications are incorporated herein by reference.

BACKGROUND OF THE INVENTION

The present invention relates to a mass spectrometer and a method of mass spectrometry. The preferred embodiment relates to an ion detector system and method of detecting ions.

It is known to use Time to Digital Converters ("TDC") and Analogue to Digital Converters ("ADC") as part of data recording electronics for many analytical instruments including Time of Flight mass spectrometers.

Time of Flight instruments incorporating Time to Digital Converters are known wherein signals resulting from ions arriving at an ion detector are recorded. Signals which satisfy defined detection criteria are recorded as a single binary value and are associated with a particular arrival time relative to a trigger event. A fixed amplitude threshold may be used to trigger recording of an ion arrival event. Ion arrival events which are subsequently recorded resulting from subsequent trigger events are combined to form a histogram of ion arrival events. The histogram of ion arrival events is then presented as a spectrum for further processing. Time to Digital Converters have the advantage of being able to detect relatively weak signals so long as the probability of multiple ions arriving at the ion detector in close temporal proximity remains relatively low. One disadvantage of Time to Digital Converters is that once an ion event has been recorded then there is a significant time interval or dead-time following the ion arrival event during which time no further ion arrival events can be recorded.

Another important disadvantage of Time to Digital Converters is that they are unable to distinguish between a signal resulting from the arrival of a single ion at the ion detector and a signal resulting from the simultaneous arrival of multiple ions at the ion detector. This is due to the fact that the signal will only cross the threshold once irrespective of whether a single ion arrived at the ion detector or whether multiple ions arrived simultaneously at the ion detector. Both situations result in only a single ion arrival event being recorded.

At relatively high signal intensities the above mentioned disadvantages coupled with the problem of dead-time effects will result in a significant number of ion arrival events failing to be recorded and/or an incorrect number of ions being recorded. This will result in an inaccurate representation of the signal intensity and an inaccurate measurement of the ion arrival time. These effects have the result of limiting the dynamic range of the ion detector system.

Time of Flight instruments which incorporate Analogue to Digital Converters are also known. An Analogue to Digital Converter is arranged to digitise signals resulting from ions arriving at the ion detector relative to a trigger event. The digitised signals resulting from subsequent trigger events are summed or averaged to produce a spectrum for further processing. A known signal averager is capable of digitising the output from ion detector electronics at a frequency of 3-4 GHz with eight or ten bit intensity resolution.

One advantage of using an Analogue to Digital Converter as part of an ion detector system is that multiple ions which arrive substantially simultaneously at an ion detector and at relatively high signal intensities can be recorded without the ion detector suffering from distortion or saturation effects. However, the detection of low intensity signals is generally limited by electronic noise from the digitiser electronics, the ion detector and the amplifier system. The problem of electronic noise also effectively limits the dynamic range of the ion detector system.

Another disadvantage of using an Analogue to Digital Converter as part of an ion detector system (as opposed to using a Time to Digital Converter as part of the ion detector system) is that the analogue width of the signal generated by a single ion adds to the width of the ion arrival envelope for a particular mass to charge value in the final spectrum. In the case of a Time to Digital Converter, only ion arrival times are recorded and hence the width of mass peaks in the final spectrum is determined only by the spread in ion arrival times for each mass peak and by variation in the voltage pulse height produced by an ion arrival relative to the signal threshold.

It is known to attempt to extend the dynamic range of both Time to Digital Converter based ion detector systems and Analogue to Digital Converter based ion detector systems by switching the transmission of the spectrometer prior to the ion detector. However, these methods have the disadvantage of having a reduced duty cycle.

Another way of attempting to extend the dynamic range of both Time to Digital Converter and Analogue to Digital Converter based ion detector systems is to use an ion detector having multiple anodes which are different sizes. However, such an approach is difficult to implement and the ion detector system can suffer from cross-talk between the anodes.

A method of increasing the dynamic range of a transient recorder by using two Analogue to Digital Converters is known. A transient signal from an ion detector is amplified using two amplifiers having different gains. The two transients are digitized and the digitized data is combined on a time sample by time sample basis. High gain samples are used unless saturation is determined to occur at which point low gain data is substituted. The low gain data is scaled by the difference in gain between the two amplifiers. The result is a combined transient having a higher dynamic range than that obtainable using a single Analogue to Digital Converter. The combined transient is added to other transients which were collected previously using a known averager method. Once a preset number of transients have been averaged the resulting spectrum is stored to disk.

There are, however, certain disadvantages inherent with the known technique. Any errors in the gain of the amplifiers of the Analogue to Digital Converter input stages or DC offsets (amplifier or Analogue to Digital Converter) or signal synchronisation of the Analogue to Digital Converters relative to the trigger event can result in significant shifts in arrival time when the data from both Analogue to Digital Converters is combined. Synchronisation between the two signals presented to the Analogue to Digital Converters is difficult to achieve at high frequencies of digitisation and attempts at correcting any time differences in the signal being digitised is, in effect, limited to one digitisation time interval which may be too coarse to be of any particular use.

The known method also suffers from the same problems as a standard averaging Analogue to Digital Converter system in terms of reduced dynamic range due to the averaging of noise at low signal intensities and degraded resolution due to the digitization of the analogue ion peak width.

Detectors using a combination of both Time to Digital Converter electronics and Analogue to Digital Converter electronics have been employed in an attempt to take advantage of the characteristics of each different type of recording device thereby attempting to increase the dynamic range and the observed time or mass resolution. However, such systems are relatively complex to calibrate and operate. Such systems are also comparatively expensive.

Recent improvements in the speed of digital processing devices have allowed the production of ion detection systems which seek to exploit the various different advantageous features of both Time to Digital Converter systems and Analogue to Digital Converter systems. Digitised transient signals are converted into arrival time and intensity pairs. The arrival time and intensity pairs from each transient are combined over a scan period into a mass spectrum. Each mass spectrum may comprise tens of thousands of transients. The resulting spectrum has the advantage in terms of resolution of Time to Digital Converter systems (i.e. the analogue peak width of an ion arrival does not contribute significantly to the final peak width of the spectrum). Furthermore, the system is able to record signal intensities which result from multiple simultaneous ion arrival events of the Analogue to Digital Converter. In addition, discrimination against electronic noise during detection of the individual time or mass intensity pairs virtually eliminates any electronic noise which would otherwise be present in the averaged data thereby increasing the dynamic range. However, although this technique does represent an improvement over previous known methods, it still suffers from a relatively limited dynamic range and at higher signal intensities it continues to suffer from saturation effects. In addition, it is difficult using the known method to know with any certainty whether the signal has at any time during the acquisition saturated the Analogue to Digital Converter especially if the input signal changes significantly, in intensity during the time during which individual transients are being combined or integrated into a final spectrum (sometimes referred to as the scan time). This can lead to mass accuracy and quantitation errors which are difficult to detect and correct.

It is therefore desired to provide an improved ion detector system and an improved method of detecting ions.

SUMMARY OF THE INVENTION

According to an aspect of the present invention there is provided a method of detecting ions comprising:

outputting a first signal and a second signal from an ion detector, wherein the first signal corresponds with a signal multiplied or amplified by a first gain and the second signal corresponds with a signal multiplied or amplified by a second different gain;

digitising the first signal to produce a first digitised signal and digitising the second signal to produce a second digitised signal;

determining first intensity and arrival time, mass or mass to charge ratio data from the first digitised signal;

determining second intensity and arrival time, mass or mass to charge ratio data from the second digitised signal; and combining the first intensity and arrival time, mass or mass to charge ratio data and the second intensity and arrival time, mass or mass to charge ratio data to form a combined data set.

The method preferably further comprises processing the first digitised signal to detect a first set of peaks or ion arrival events and/or processing the second digitised signal to detect a second set of peaks or ion arrival events.

According to an embodiment the step of determining the first intensity and arrival time, mass or mass to charge ratio data from the first digitised signal further comprises determining first intensity and arrival time, mass or mass to charge ratio data for each or at least some peaks or ion arrival events in the first set of peaks or ion arrival events; and/or the step of determining the second intensity and arrival time, mass or mass to charge ratio data from the second digitised signal further comprises determining second intensity and arrival time, mass or mass to charge ratio data for each or at least some peaks or ion arrival events in the second set of peaks or ion arrival events.

The step of determining the first intensity and arrival time, mass or mass to charge ratio data preferably further comprises marking or flagging each peak or ion arrival event in the first set of peaks or ion arrival events when the maximum digitised signal within a peak or ion arrival event is determined as equaling or approaching a maximum or full scale digitised output or is otherwise saturated or approaching saturation. The step of determining the second intensity and arrival time, mass or mass to charge ratio data preferably further comprises marking or flagging each peak or ion arrival event in the second set of peaks or ion arrival events when the maximum digitised signal within a peak or ion arrival event is determined as equaling or approaching a maximum or full scale digitised output or is otherwise saturated or approaching saturation.

The step of combining the first intensity and arrival time, mass or mass to charge ratio data and the second intensity and arrival time, mass or mass to charge ratio data preferably further comprises:

(a) selecting peak intensity and arrival time, mass or mass to charge ratio data from the second set of peaks or ion arrival events for each or at least some peaks or ion arrival events which are not marked or flagged or otherwise indicated as suffering from or approaching saturation; and/or (b) selecting peak intensity and arrival time, mass or mass to charge ratio data from the first set of peaks or ion arrival events when the nearest peak or a close peak or an ion arrival event having the nearest or a close arrival time in the second set of peaks or ion arrival events is marked or flagged or otherwise indicated as suffering from or approaching saturation.

The method preferably further comprises scaling the peaks or ion arrival events selected from the first set of peaks or ion arrival events by a scale factor. The scale factor preferably corresponds with, is close to or is otherwise related to the ratio of the second gain to the first gain.

The method preferably further comprises summing the combined data set with a plurality of other corresponding combined data sets to form a final spectrum.

According to another aspect of the present invention there is provided a method of detecting ions comprising:

outputting a first signal and a second signal from an ion detector, wherein the first signal corresponds with a signal multiplied or amplified by a first gain and the second signal corresponds with a signal multiplied or amplified by a second different gain;

digitising the first signal to produce a first digitised signal and digitising the second signal to produce a second digitised signal;

summing the first digitised signal with a plurality of other corresponding first digitised signals to form a first summed digitised signal;

summing the second digitised signal with a plurality of other corresponding second digitised signals to form a second summed digitised signal;

determining first summed intensity and arrival time, mass or mass to charge ratio data from the first summed digitised signal;

determining second summed intensity and arrival time, mass or mass to charge ratio data from the second summed digitised signal; and combining the first summed intensity and arrival time, mass or mass to charge ratio data and the second summed intensity and arrival time, mass or mass to charge ratio data to form a final spectrum.

The method preferably further comprises processing the first summed digitised signal to detect a first set of peaks or ion arrival events and/or processing the second summed digitised signal to detect a second set of peaks or ion arrival events.

The step of determining the first summed intensity and arrival time, mass or mass to charge ratio data from the first summed digitised signal preferably further comprises determining first summed intensity and arrival time, mass or mass to charge ratio data for each or at least some peaks or ion arrival events in the first set of peaks or ion arrival events. The step of determining the second summed intensity and arrival time, mass or mass to charge ratio data from the second summed digitised signal preferably further comprises determining second summed intensity and arrival time, mass or mass to charge ratio data for each or at least some peaks or ion arrival events in the second set of peaks or ion arrival events.

The step of determining the first summed intensity and arrival time, mass or mass to charge ratio data preferably further comprises marking or flagging each peak or ion arrival event in the first set of peaks or ion arrival events when the maximum digitised signal within a peak or ion arrival event is determined as equaling or approaching a maximum or full scale digitised output or is otherwise saturated or approaching saturation. The step of determining the second summed intensity and arrival time, mass or mass to charge ratio data preferably further comprises marking or flagging each peak or ion arrival event in the second set of peaks or ion arrival events when the maximum digitised signal within a peak or ion arrival event is determined as equaling or approaching a maximum or full scale digitised output or is otherwise saturated or approaching saturation.

The step of combining the first summed intensity and arrival time, mass or mass to charge ratio data and the second summed intensity and arrival time, mass or mass to charge ratio data preferably further comprises:

(a) selecting peak intensity and arrival time, mass, or mass to charge ratio data from the second set of peaks or ion arrival events for each or at least some peaks or ion arrival events which are not marked or flagged or otherwise indicated as suffering from or approaching saturation; and/or (b) selecting peak intensity and arrival time, mass or mass to charge ratio data from the first set of peaks or ion arrival events when the nearest peak or a close peak or an ion arrival event having the nearest or a close arrival time in, the second set of peaks or ion arrival events is marked or flagged or otherwise indicated as suffering from or approaching saturation.

The method preferably further comprises scaling the peaks or ion arrival events selected from the first set of peaks or ion arrival events by a scale factor. The scale factor preferably corresponds with, is close to or is otherwise related to the ratio of the second gain to the first gain.

According to another aspect of the present invention there is provided a method of detecting ions comprising:

outputting a first signal and a second signal from an ion detector, wherein the first signal corresponds with a signal multiplied or amplified by a first gain and the second signal corresponds with a signal multiplied or amplified by a second different gain;

digitising the first signal to produce a first digitised signal and digitising the second signal to produce a second digitised signal;

combining the first digitised signal and the second digitised signal to form a combined digitised signal;

determining intensity and arrival time, mass or mass to charge ratio data from the combined digitised signal; and summing the intensity and arrival time, mass or mass to charge ratio data with a plurality of other corresponding intensity and arrival time, mass or mass to charge ratio data to form a final spectrum.

The method preferably further comprises processing the combined digitised signal to detect a set of peaks or ion arrival events.

The step of determining the intensity and arrival time, mass or mass to charge ratio data from the combined digitised signal preferably further comprises determining intensity and arrival time, mass or mass to charge ratio data for each or at least some peaks or ion arrival events in the set of peaks or ion arrival events.

The step of determining the intensity and arrival time, mass or mass to charge ratio data preferably further comprises marking or flagging each peak or ion arrival event in the first digitised signal when the maximum digitised signal within a peak or ion arrival event is determined as equaling or approaching a maximum or full scale digitised output or is otherwise saturated or approaching saturation. The step of determining the intensity and arrival time, mass or mass to charge ratio data preferably further comprises marking or flagging each peak or ion arrival event in the second digitised signal when the maximum digitised signal within a peak or ion arrival event is determined as equaling or approaching a maximum or full scale digitised output or is otherwise saturated or approaching saturation.

The step of combining the first digitised signal and the second digitised signal preferably further comprises:

(a) selecting peak intensity and arrival time, mass or mass to charge ratio data from the second digitised signal for each or at least some peaks or ion arrival events which are not marked or flagged or otherwise indicated as suffering from or approaching saturation; and/or (b) selecting peak intensity and arrival time, mass or mass to charge ratio data from the first digitised signal when the nearest peak or a close peak or an ion arrival event having the nearest or a close arrival time in the second digitised signal is marked or flagged or otherwise indicated as suffering from or approaching saturation.

The method preferably further comprises scaling the peaks or ion arrival events selected from the first digitised signal by a scale factor. The scale factor preferably corresponds with, is close to or is otherwise related to the ratio of the second gain to the first gain.

According to another aspect of the present invention there is provided a method of detecting ions comprising:

outputting a first signal and a second signal from an ion detector, wherein the first signal corresponds with a signal multiplied or amplified by a first gain and the second signal corresponds with a signal multiplied or amplified by a second different gain;

digitising the first signal to produce a first digitised signal and digitising the second signal to produce a second digitised signal;

combining the first digitised signal and the second digitised signal to form a combined digitised signal;

summing the combined digitised signal with a plurality of other corresponding combined digitised signals to form a final spectrum; and determining intensity and arrival time, mass or mass to charge ratio data from the final spectrum.

The method preferably further comprises processing the final spectrum to detect a set of peaks or ion arrival events.

The step of determining the intensity and arrival time, mass or mass to charge ratio data from the final spectrum preferably further comprises determining intensity and arrival time, mass or mass to charge ratio data for each or at least some peaks or ion arrival events in the set of peaks or ion arrival events.

The step of determining the intensity and arrival time, mass or mass to charge ratio data preferably further comprises marking or flagging each peak or ion arrival event in the first digitised signal when the maximum digitised signal within a peak or ion arrival event is determined as equaling or approaching a maximum or full scale digitised output or is otherwise saturated or approaching saturation. The step of determining the intensity and arrival time, mass or mass to charge ratio data preferably further comprises marking or flagging each peak or ion arrival event in the second digitised signal when the maximum digitised signal within a peak or ion arrival event is determined as equaling or approaching a maximum or full scale digitised output or is otherwise saturated or approaching saturation.

The step of combining the first digitised signal and the second digitised signal preferably further comprises:

(a) selecting peak intensity and arrival time, mass or mass to charge ratio data from the second digitised signal for each or at least some peaks or ion arrival events which are not marked or flagged or otherwise indicated as suffering from or approaching saturation; and/or (b) selecting peak intensity and arrival time, mass or mass to charge ratio data from the first digitised signal when the nearest peak or a close peak or an ion arrival event having the nearest or a close arrival time in the second digitised signal is marked or flagged or otherwise indicated as suffering from or approaching saturation.

The method preferably further comprises scaling the peaks or ion arrival events selected from the first digitised signal by a scale factor. The scale factor preferably corresponds with, is close to or is otherwise related to the ratio of the second gain to the first gain.

According to another aspect of the present invention there is provided a method of detecting ions comprising:

outputting a first signal and a second signal from an ion detector, wherein the first signal corresponds with a signal multiplied or amplified by a first gain and the second signal corresponds with a signal multiplied or amplified by a second different gain;

digitising the first signal to produce a first digitised signal and digitising the second signal to produce a second digitised signal;

determining first intensity and arrival time, mass or mass to charge ratio data from the first digitised signal;

determining second intensity and arrival time, mass or mass to charge ratio data from the second digitised signal;

summing the first intensity and arrival time, mass or mass to charge ratio data with a plurality of other corresponding first intensity and arrival time, mass or mass to charge ratio data to form a first summed spectrum;

summing the second intensity and arrival time, mass or mass to charge ratio data with a plurality of other corresponding second intensity and arrival time, mass or mass to charge ratio data to form a second summed spectrum; and combining the first summed spectrum and the second summed spectrum to form a final spectrum.

The method preferably further comprises processing the first digitised signal to detect a first set of peaks or ion arrival events and/or processing the second digitised signal to detect a second set of peaks or ion arrival events.

The step of determining the first intensity and arrival time, mass or mass to charge ratio data from the first digitised signal preferably further comprises determining intensity and arrival time, mass or mass to charge ratio data for each or at least some peaks or ion arrival events in the first set of peaks or ion arrival events. The step of determining the second intensity and arrival time, mass or mass to charge ratio data from the second digitised signal preferably further comprises determining intensity and arrival time, mass or mass to charge ratio data for each or at least some peaks or ion arrival events in the second set of peaks or ion arrival events.

The step of determining the first intensity and arrival time, mass or mass to charge ratio data preferably further comprises marking or flagging each peak or ion arrival event in the first set of peaks or ion arrival events when the maximum digitised signal within a peak or ion arrival event is determined as equaling or approaching a maximum or full scale digitised output or is otherwise saturated or approaching saturation. The step of determining the second intensity and arrival time, mass or mass to charge ratio data preferably further comprises marking or flagging each peak or ion arrival event in the second set of peaks or ion arrival events when the maximum digitised signal within a peak or ion arrival event is determined as equaling or approaching a maximum or full scale digitised output or is otherwise saturated or approaching saturation.

The step of combining the first summed spectrum and the second summed spectrum to form a final spectrum preferably further comprises:

(a) selecting peak intensity and arrival time, mass or mass to charge ratio data from the second summed spectrum for each or at least some peaks or ion arrival events which are not marked or flagged or otherwise indicated as suffering from or approaching saturation; and/or (b) selecting peak intensity and arrival time, mass or mass to charge ratio data from the first summed spectrum when the nearest peak or a close peak or an ion arrival event having the nearest or a close arrival time in the second summed spectrum is marked or flagged or otherwise indicated as suffering from or approaching saturation.

The method preferably further comprises scaling the peaks or ion arrival events selected from the first summed spectrum by a scale factor. The scale factor preferably corresponds with, is close to or is otherwise related to the ratio of the second gain to the first gain.

According to another aspect of the present invention there is provided a method of detecting ions comprising:

outputting a first signal and a second signal from an ion detector, wherein the first signal corresponds with a signal multiplied or amplified by a first gain and the second signal corresponds with a signal multiplied or amplified by a second different gain;

digitising the first signal to produce a first digitised signal and digitising the second signal to produce a second digitised signal;

summing the first digitised signal with a plurality of other corresponding first digitised signals to form a first summed digital signal;

summing the second digitised signal with a plurality of other corresponding second digitised signals to form a second summed digital signal;

determining first summed intensity and arrival time, mass or mass to charge ratio data from the first summed digital signal;

determining second summed intensity and arrival time, mass or mass to charge ratio data from the second summed digital signal; and combining the first summed intensity and arrival time, mass or mass to charge ratio data from the first summed digital signal and the second summed intensity and arrival time, mass or mass to charge ratio data from the second summed digital signal to produce a final spectrum.

The method preferably further comprises processing the first digitised signal to detect a first set of peaks or ion arrival events and/or processing the second digitised signal to detect a second set of peaks or ion arrival events.

The step of determining the first summed intensity and arrival time, mass or mass to charge ratio data from the first summed digitised signal preferably further comprises determining intensity and arrival time, mass or mass to charge ratio data for each or at least some peaks or ion arrival events in the first set of peaks or ion arrival events. The step of determining the second summed intensity and arrival time, mass or mass to charge ratio data from the second summed digitised signal preferably further comprises determining intensity and arrival time, mass or mass to charge ratio data for each or at least some peaks or ion arrival events in the second set of peaks or ion arrival events.

The step of determining the first summed intensity and arrival time, mass or mass to charge ratio data preferably further comprises marking or flagging each peak or ion arrival event in the first set of peaks or ion arrival events when the maximum digitised signal within a peak or ion arrival event is determined as equaling or approaching a maximum or full scale digitised output or is otherwise saturated or approaching saturation. The step of determining the second summed intensity and arrival time, mass or mass to charge ratio data preferably further comprises marking or flagging each peak or ion arrival event in the second set of peaks or ion arrival events when the maximum digitised signal within a peak or ion arrival event is determined as equaling or approaching a maximum or full scale digitised output or is otherwise saturated or approaching saturation.

The step of combining the first summed spectrum and the second summed spectrum to form a final spectrum preferably further comprises:

(a) selecting peak intensity and arrival time, mass or mass to charge ratio data from the second summed spectrum for each or at least some peaks or ion arrival events which are not marked or flagged or otherwise indicated as suffering from or approaching saturation; and/or (b) selecting peak intensity and arrival time, mass or mass to charge ratio data from the first summed spectrum when the nearest peak or a close peak or an ion arrival event having the nearest or a close arrival time in the second summed spectrum is marked or flagged or otherwise indicated as suffering from or approaching saturation.

The method preferably further comprises scaling the peaks or ion arrival events selected from the first summed spectrum by a scale factor. The scale factor preferably corresponds with, is close to or is otherwise related to the ratio of the second gain to the first gain.

According to an embodiment of the present invention the method further comprises either:

(a) applying a linear correction to the first digitised signal and/or applying a linear correction to the second digitised signal; and/or (b) applying a linear correction to the first digitised signal prior to the step of determining first intensity and arrival time, mass or mass to charge ratio data from the first digitised signal and/or applying a linear correction to the second digitised signal prior to the step of determining second intensity and arrival time, mass or mass to charge ratio data from the second digitised signal. Other embodiments are contemplated comprising applying a linear correction to a combined digitised signal.

The step of outputting a first signal and a second signal may according to the preferred embodiment comprise converting, splitting or dividing a signal output from an ion detector into a first signal and a second signal. The first and second signals are then multiplied or amplified by different gains. Alternatively, according to a less preferred embodiment the step of outputting the first signal and the second signal may comprise monitoring or outputting the signal from an ion detector at least two different positions or locations in or along one or more dynodes or another part of an ion detector.

The first gain may be substantially greater than the second gain or more preferably the second gain may be substantially greater than the first gain.

According to an embodiment the ratio of the first gain to the second gain is preferably selected from the group consisting of: (i) <2; (ii) 2-5; (iii) 5-10; (iv) 10-15; (v) 15-20; (vi) 20-25; (vii) 25-30; (viii) 30-35; (ix) 35-40; (x) 40-45; (xi) 45-50; (xii) 50-60; (xiii) 60-70; (xiv) 70-80; (xv) 80-90; (xvi) 90-100; and (xvii) >100. According to the preferred embodiment the ratio of the second gain to the first gain is preferably selected from the group consisting of: (i) <2; (ii) 2-5; (iii) 5-10; (iv) 10-15; (v) 15-20; (vi) 20-25; (vii) 25-30; (viii) 30-35; (ix) 35-40; (x) 40-45; (xi) 45-50; (xii) 50-60; (xiii) 60-70; (xiv) 70-80; (xv) 80-90; (xvi) 90-100; and (xvii) >100.

The steps of digitising the first signal and digitising the second signal are preferably performed substantially simultaneously.

The step of digitising the first signal preferably comprises using a first Analogue to Digital Converter and/or the step of digitising the second signal comprises using a second Analogue to Digital Converter. The first Analogue to Digital Converter and/or the second Analogue to Digital Converter are preferably arranged to convert an analogue voltage to a digital output. The first Analogue to Digital Converter and/or the second Analogue to Digital Converter are preferably arranged to operate, in use, at a digitisation rate selected from the group consisting of: (i) <1 GHz; (ii) 1-2 GHz; (iii) 2-3 GHz; (iv) 3-4 GHz; (v) 4-5 GHz; (vi) 5-6 GHz; (vii) 6-7 GHz; (viii) 7-8 GHz; (ix) 8-9 GHz; (x) 9-10 GHz; and (xi) >10 GHz. The first Analogue to Digital Converter and/or the second Analogue to Digital Converter preferably comprise a resolution selected from the group consisting of: (i) at least 4 bits; (ii) at least 5 bits; (iii) at least 6 bits; (iv) at least 7 bits; (v) at least 8 bits; (vi) at least 9 bits; (vii) at least 10 bits; (viii) at least 11 bits; (ix) at least 12 bits; (x) at least 13 bits; (xi) at least 14 bits; (xii) at least 15 bits; and (xiii) at least 16 bits.

The method preferably further comprises flagging data in the first digitised signal and/or the second digitised signal which is determined as corresponding to data which was obtained when an ion detector was saturated or nearing saturation.

According to an embodiment the method further comprises either:

(a) replacing at least part of the first digitised signal with at least part of the second digitised signal if it is determined that at least part of the first digitised signal suffers from saturation effects; and/or (b) replacing at least part of the second digitised signal with at least part of the first digitised signal if it is determined that at least part of the second digitised signal suffers from saturation effects.

According to another aspect of the present invention there is provided a method of mass spectrometry comprising a method of detecting ions as claimed in any preceding claim.

According to various embodiments of the present invention the method may comprise outputting a signal from an ion detector, wherein the signal is multiplied or amplified by a first gain to give the first (amplified) signal and outputting another signal which is multiplied or amplified by a second preferably higher gain to give the second (amplified) signal.

According to another aspect of the present invention there is provided an ion detector system comprising:

a device arranged and adapted to output a first signal and a second signal from an ion detector, wherein the first signal corresponds with a signal multiplied or amplified by a first gain and the second signal corresponds with a signal multiplied or amplified by a second different gain;

a device arranged and adapted to digitise the first signal to produce a first digitised signal and a device arranged and adapted to digitise the second signal to produce a second digitised signal;

a device arranged and adapted to determine first intensity and arrival time, mass or mass to charge ratio data from the first digitised signal;

a device arranged and adapted to determine second intensity and arrival time, mass or mass to charge ratio data from the second digitised signal; and a device arranged and adapted to combine the first intensity and arrival time, mass or mass to charge ratio data and the second intensity and arrival time, mass or mass to charge ratio data to form a combined data set.

According to another aspect of the present invention there is provided an ion detector system comprising:

a device arranged and adapted to output a first signal and a second signal from an ion detector, wherein the first signal corresponds with a signal multiplied or amplified by a first gain and the second signal corresponds with a signal multiplied or amplified by a second different gain;

a device arranged and adapted to digitise the first signal to produce a first digitised signal and a device arranged and adapted to digitise the second signal to produce a second digitised signal;

a device arranged and adapted to sum the first digitised signal with a plurality of other corresponding first digitised signals to form a first summed digitised signal;

a device arranged and adapted to sum the second digitised signal with a plurality of other corresponding second digitised signals to form a second summed digitised signal;

a device arranged and adapted to determine first summed intensity and arrival time, mass or mass to charge ratio data from the first summed digitised signal;

a device arranged and adapted to determine second summed intensity and arrival time, mass or mass to charge ratio data from the second summed digitised signal; and a device arranged and adapted to combine the first summed intensity and arrival time, mass or mass to charge ratio data and the second summed intensity and arrival time, mass or mass to charge ratio data to form a final spectrum.

According to another aspect of the present invention there is provided an ion detector system comprising:

a device arranged and adapted to output a first signal and a second signal from an ion detector, wherein the first signal corresponds with a signal multiplied or amplified by a first gain and the second signal corresponds with a signal multiplied or amplified by a second different gain;

a device arranged and adapted to digitise the first signal to produce a first digitised signal and a device arranged and adapted to digitise the second signal to produce a second digitised signal;

a device arranged and adapted to combine the first digitised signal and the second digitised signal to form a combined digitised signal;

a device arranged and adapted to determine intensity and arrival time, mass or mass to charge ratio data from the combined digitised signal; and a device arranged and adapted to sum the intensity and arrival time, mass or mass to charge ratio data with a plurality of other corresponding intensity and arrival time, mass or mass to charge ratio data to form a final spectrum.

According to another aspect of the present invention there is provided an ion detector system comprising:

a device arranged and adapted to output a first signal and a second signal from an ion detector, wherein the first signal corresponds with a signal multiplied or amplified by a first gain and the second signal corresponds with a signal multiplied or amplified by a second different gain;

a device arranged and adapted to digitise the first signal to produce a first digitised signal and a device arranged and adapted to digitise the second signal to produce a second digitised signal;

a device arranged and adapted to combine the first digitised signal and the second digitised signal to form a combined digitised signal;

a device arranged and adapted to sum the combined digitised signal with a plurality of other corresponding combined digitised signals to form a final spectrum; and a device arranged and adapted to determine intensity and arrival time, mass or mass to charge ratio data from the final spectrum.

According to another aspect of the present invention there is provided an ion detector system comprising:

a device arranged and adapted to output a first signal and a second signal from an ion detector, wherein the first signal corresponds with a signal multiplied or amplified by a first gain and the second signal corresponds with a signal multiplied or amplified by a second different gain;

a device arranged and adapted to digitise the first signal to produce a first digitised signal and a device arranged and adapted to digitise the second signal to produce a second digitised signal;

a device arranged and adapted to determine first intensity and arrival time, mass or mass to charge ratio data from the first digitised signal;

a device arranged and adapted to determine second intensity and arrival time, mass or mass to charge ratio data from the second digitised signal;

a device arranged and adapted to sum the first intensity and arrival time, mass or mass to charge ratio data with a plurality of other corresponding first intensity and arrival time, mass or mass to charge ratio data to form a first summed spectrum;

a device arranged and adapted to sum the second intensity and arrival time, mass or mass to charge ratio data with a plurality of other corresponding second intensity and arrival time, mass or mass to charge ratio data to form a second summed spectrum; and a device arranged and adapted to combine the first summed spectrum and the second summed spectrum to form a final spectrum.

According to another aspect of the present invention there is provided an ion detector system comprising:

a device arranged and adapted to output a first signal and a second signal from an ion detector, wherein the first signal corresponds with a signal multiplied or amplified by a first gain and the second signal corresponds with a signal multiplied or amplified by a second different gain;

a device arranged and adapted to digitise the first signal to produce a first digitised signal and a device arranged and adapted to digitise the second signal to produce a second digitised signal;

a device arranged and adapted to sum the first digitised signal with a plurality of other corresponding first digitised signals to form a first summed digital signal;

a device arranged and adapted to sum the second digitised signal with a plurality of other corresponding second digitised signals to form a second summed digital signal;

a device arranged and adapted to determine first intensity and arrival time, mass or mass to charge ratio data from the first summed digital signal;

a device arranged and adapted to determine second intensity and arrival time, mass or mass to charge ratio data from the second summed digital signal; and a device arranged and adapted to combine the first intensity and arrival time, mass or mass to charge ratio data from the first summed digital signal and the second intensity and arrival time, mass or mass to charge ratio data from the second summed digital signal to produce a final spectrum.

According to another aspect of the present invention there is provided a mass spectrometer comprising an ion detector system as described above.

The mass spectrometer preferably further comprises either:

(a) an ion source arranged upstream of the ion detector system, wherein the ion source is selected from the group consisting of: (i) an Electrospray ionisation ("ESI") ion source; (ii) an Atmospheric Pressure Photo Ionisation ("APPI") ion source; (iii) an Atmospheric Pressure Chemical Ionisation ("APCI") ion source; (iv) a Matrix Assisted Laser Desorption Ionisation ("MALDI") ion source; (v) a Laser Desorption Ionisation ("LDI") ion source; (vi) an Atmospheric Pressure Ionisation ("API") ion source; (vii) a Desorption Ionisation on Silicon ("DIOS") ion source; (viii) an Electron Impact ("EI") ion source; (ix) a Chemical Ionisation ("CI") ion source; (x) a Field Ionisation ("FI") ion source; (xi) a Field Desorption ("FD") ion source; (xii) an Inductively Coupled Plasma ("ICP") ion source; (xiii) a Fast Atom Bombardment ("FAB") ion source; (xiv) a Liquid Secondary Ion Mass Spectrometry ("LSIMS") ion source; (xv) a Desorption Electrospray Ionisation ("DESI") ion source; (xvi) a Nickel-63 radioactive ion source; (xvii) an Atmospheric Pressure Matrix Assisted Laser Desorption' Ionisation ion source; and (xviii) a Thermospray ion source; and/or (b) one or more ion guides arranged upstream of the ion detector system; and/or (c) one or more ion mobility separation devices and/or one or more Field Asymmetric Ion Mobility Spectrometer devices arranged upstream of the ion detector system; and/or (d) one or more ion traps or one or more ion trapping regions arranged upstream of the ion detector system; and/or (e) a collision, fragmentation or reaction cell arranged upstream of the ion detector system, wherein the collision, fragmentation or reaction cell is selected from the group consisting of: (i) a Collisional Induced Dissociation ("CID") fragmentation device; (ii) a Surface Induced Dissociation ("SID") fragmentation device; (iii) an Electron Transfer Dissociation fragmentation device; (iv) an Electron Capture Dissociation fragmentation device; (v) an Electron Collision or Impact Dissociation fragmentation device; (vi) a Photo Induced Dissociation ("PID") fragmentation device; (vii) a Laser Induced Dissociation fragmentation device; (viii) an infrared radiation induced dissociation device; (ix) an ultraviolet radiation induced dissociation device; (x) a nozzle-skimmer interface fragmentation device; (xi) an in-source fragmentation device; (xii) an ion-source Collision Induced Dissociation fragmentation device; (xiii) a thermal or temperature source fragmentation device; (xiv) an electric field induced fragmentation device; (xv) a magnetic field induced fragmentation device; (xvi) an enzyme digestion or enzyme degradation fragmentation device; (xvii) an ion-ion reaction fragmentation device; (xviii) anion-molecule reaction fragmentation device; (xix) an ion-atom reaction fragmentation device; (xx) an ion-metastable ion reaction fragmentation device; (xxi) an ion-metastable molecule reaction fragmentation device; (xxii) an ion-metastable atom reaction fragmentation device; (xxiii) an ion-ion reaction device for reacting ions to form adduct or product ions; (xxiv) an ion-molecule reaction device for reacting ions to form adduct or product ions; (xxv) an ion-atom reaction device for reacting ions to form adduct or product ions; (xxvi) an ion-metastable ion reaction device for reacting ions to form adduct or product ions; (xxvii) an ion-metastable molecule reaction device for reacting ions to form adduct or product ions; and (xxviii) an ion-metastable atom reaction device for reacting ions to form adduct or product ions; and/or (f) a mass analyser selected from the group consisting of: (i) a quadrupole mass analyser; (ii) a 2D or linear quadrupole mass analyser; (iii) a Paul or 3D quadrupole mass analyser; (iv) a Penning trap mass analyser; (v) an ion trap mass analyser; (vi) a magnetic sector mass analyser; (vii) Ion Cyclotron Resonance ("ICR") mass analyser; (viii) a Fourier Transform Ion Cyclotron Resonance ("FTICR") mass analyser; (ix) an electrostatic or orbitrap mass analyser; (x) a Fourier Transform electrostatic or orbitrap mass analyser; (xi) a Fourier Transform mass analyser; (xii) a Time of Flight mass analyser; (xiii) an orthogonal acceleration Time of Flight mass analyser; and (xiv) a linear acceleration Time of Flight mass analyser.

According to an aspect of the present invention there is provided a mass spectrometer comprising an ion detector. The ion current arriving at the ion detector preferably varies in magnitude as a function of time. The output current from the ion detector is preferably passed to a voltage converter and amplifier. Two or more output voltages are preferably provided or output from the amplifier. Two or more Analogue to Digital Converters (ADCs) are preferably provided which preferably convert the two or more output voltages to digital outputs. Further processing of the digital outputs preferably produces one or more sets of data which preferably comprise time and intensity pairs (or mass or mass to charge ratio and intensity pairs).

According to a preferred embodiment, each of the two or more digital outputs are preferably processed to produce sets of time and intensity pairs (or sets of mass or mass to charge ratio and intensity pairs). The sets of time and intensity pairs (or sets of mass or mass to charge ratio and intensity pairs) are preferably combined to yield a single set of time and intensity pairs (or a single set of mass or mass to charge ratio and intensity pairs) wherein the single set of data preferably has an increased dynamic range.

According to a less preferred embodiment the two digital outputs from the two Analogue to Digital Converters may be combined into a single digital output or transient having an increased dynamic range. The single digital output or transient is then preferably processed to produce a set of time and intensity pairs (or a set of mass or mass to charge ratio and intensity pairs). A multitude of corresponding sets of time and intensity pairs (or a multitude of sets of mass or mass to charge ratio and intensity pairs) are preferably combined to form a summed spectrum comprising time and intensity pairs (or mass or mass to charge ratio and intensity pairs).

According to another embodiment each of the two or more digital outputs may be processed to produce a first and second set of time and intensity pairs (or a first and second set of mass or mass to charge ratio and intensity pairs). A multitude of first sets of time and intensity pairs (or mass or mass to charge ratio and intensity pairs) are preferably combined to form a single combined set of first sets of time and intensity pairs (or mass or mass to charge ratio and intensity pairs). Likewise, a multitude of second sets of time and intensity pairs (or mass or mass to charge ratio and intensity pairs) are preferably combined to form a single combined set of second sets of time and intensity pairs (or mass or mass to charge ratio and intensity pairs). The first and second combined sets of time and intensity pairs (or mass or mass to charge ratio and intensity pairs) are preferably combined to yield a single combined set of time and intensity pairs (or mass or mass to charge ratio and intensity pairs) having an increased dynamic range.

According to the preferred embodiment the ion current to voltage converter and the amplifier is preferably arranged to have a linear output voltage with respect to the input current. However, according to other less preferred embodiments the output voltage may vary in a substantially non-linear manner with respect to the input current and may, for example, be continuous or discontinuous. According to an embodiment the relationship between the output voltage and the input current may comprise a logarithmic function, a square function, a square root function, a power function, an exponential function, a stepped function or a function incorporating one or more linear functions and/or one or more non-linear functions and/or one or more step functions and/or any combination thereof.

According to the preferred embodiment the mass spectrometer preferably comprises a Time of Flight mass spectrometer or mass analyser. However, other less preferred embodiments are contemplated wherein the mass spectrometer or mass analyser may comprise another type of mass spectrometer which provides an ion current that varies in magnitude as a function of time.

According to the preferred embodiment the transient signal from the ion detector is preferably converted, split or output into two separate transient signals. The first transient signal is preferably amplified with or by a gain of A and the second transient signal is preferably amplified with or by a gain of B. According to an embodiment A>B. According to an alternative embodiment B>A. The two transient signals are preferably simultaneously digitised and processed to determine the arrival time (or mass or mass to charge ratio) and intensity of all of the ion events occurring. As a result two lists are preferably produced. During this processing sequence any event determined to include a digital sample that has an amplitude which saturates the Analogue to Digital Converter is preferably identified and flagged. The first list is preferably examined to select or identify any events-determined to be suffering from saturation effects. If saturation is determined to have occurred then the event is preferably replaced with the arrival time and intensity of the corresponding event or events from the second transient with the intensity multiplied by the ratio of the two gains A/B (or B/A). The events in this combined list are preferably combined with those collected in or from previous or other transients. Once a predetermined number of transients has been collected and combined, the resultant combined spectrum is preferably transferred for storage to disk and the process is preferably repeated.

BRIEF DESCRIPTION OF THE DRAWINGS

Various embodiments of the present invention together with an arrangement given for illustrative purposes only will now be described, by way of example only, and with reference to the accompanying drawings in which.

DETAILED DESCRIPTION OF THE PREFERRED EMBODIMENTS

Figure 1:
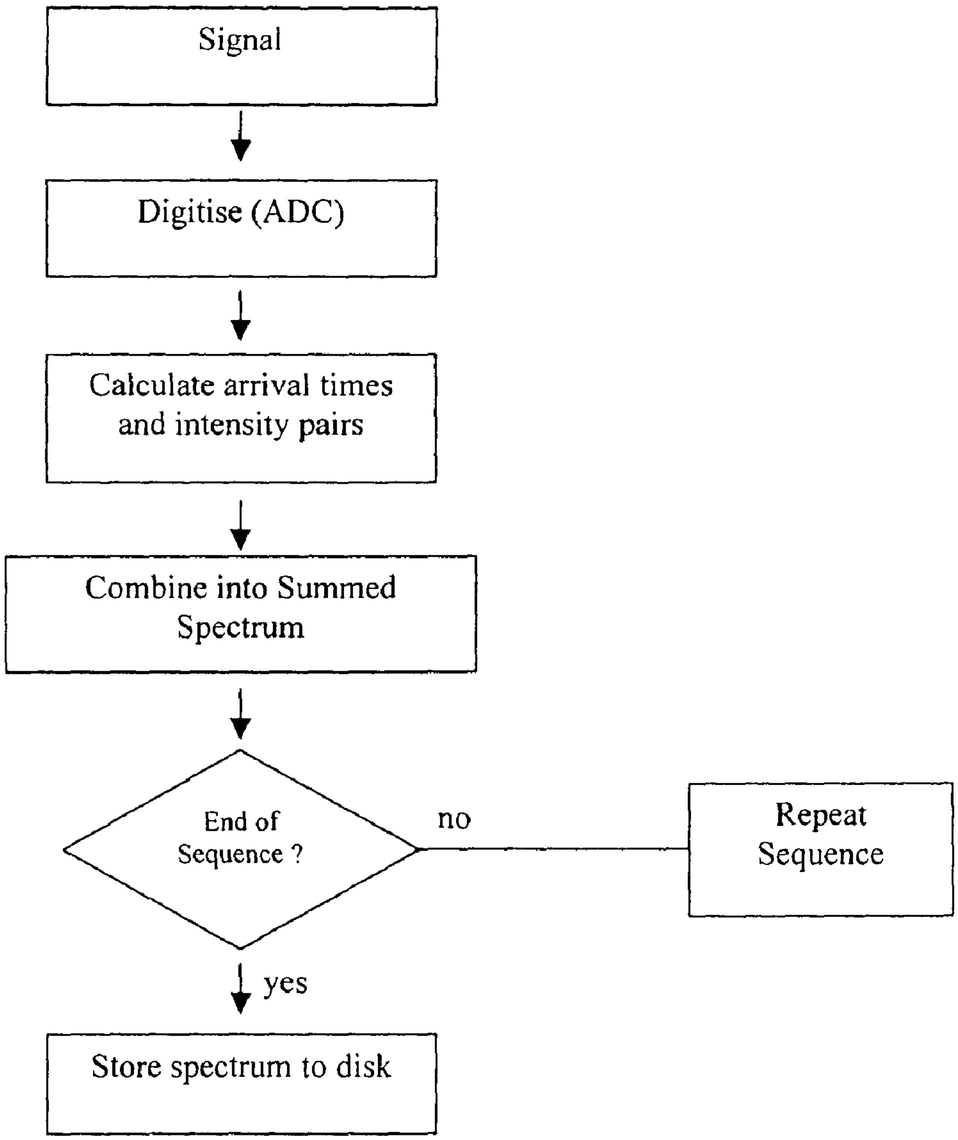
FIG. 1 PRIOR ART
FIG. 1 shows a flow diagram of a known Analogue to Digital Converter ion detection system.

A flow diagram illustrating a known Analogue to Digital Converter ion detector system is shown in FIG. 1. An input transient signal resulting from a trigger event is digitised and converted into arrival time and intensity pairs at the end of each transients predefined record length. A series of arrival time and intensity pairs are combined with those of other mass spectra within a predefined integration period or scan time to form a single mass spectrum. Each mass spectrum may comprise many tens of thousands of transients.

A significant disadvantage of the known method is that it has a limited dynamic range and at relatively high signal intensities the Analogue to Digital Converter will suffer from saturation effects. It is also difficult to determine with any certainty whether or not the signal within an individual transient has saturated the Analogue to Digital Converter especially if the input signal changes significantly in intensity during the scan time. This frequently occurs, for example, on the leading or falling edge of an eluting LC peak. This can lead to inaccuracies in mass measurement and quantitation which are difficult to detect in the final data set.

Figure 2:
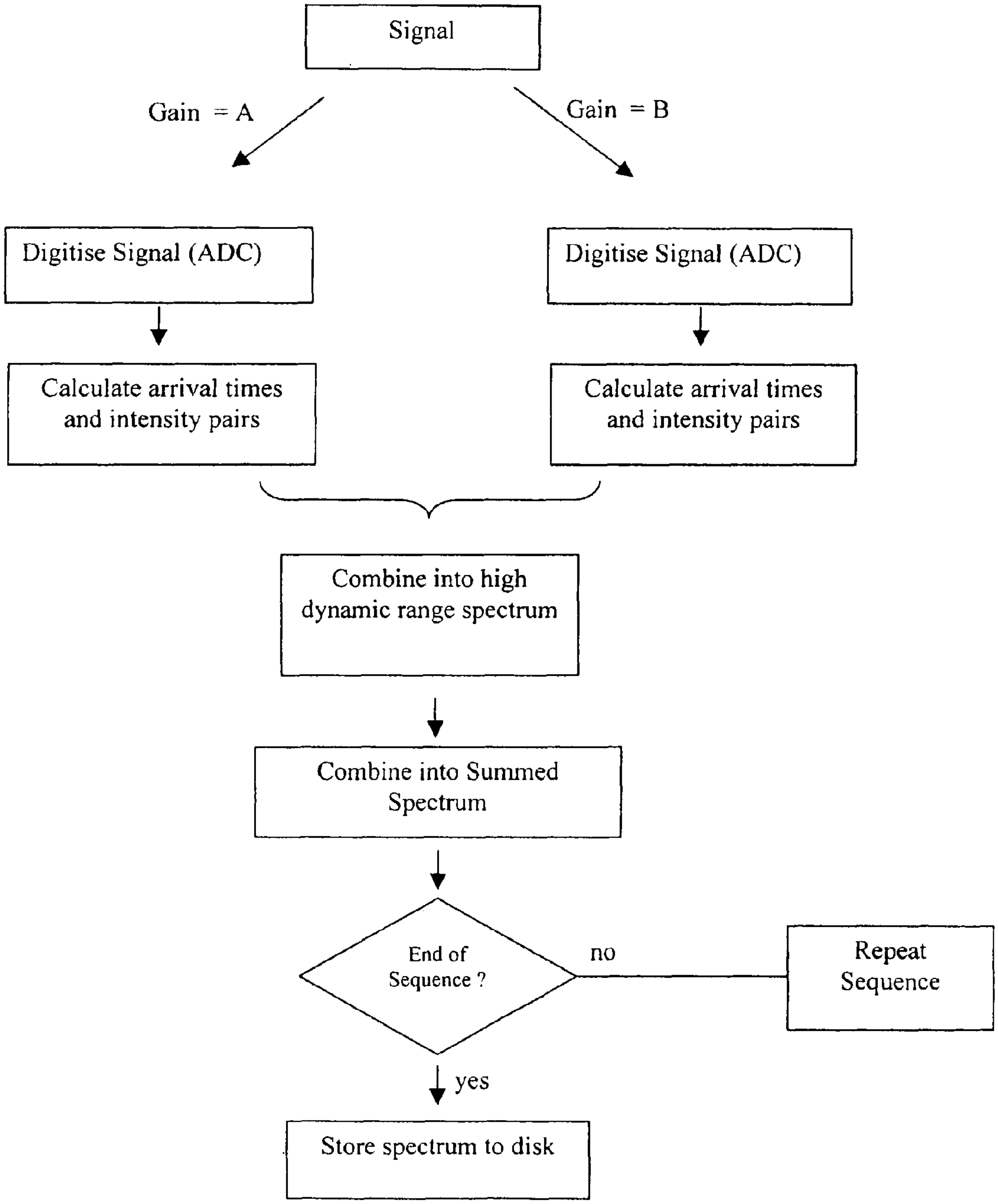
FIG. 2 shows a flow diagram illustrating a preferred embodiment of the present invention wherein a signal output from an ion detector is divided into two signals which are amplified by different gains, and wherein arrival time and intensity pairs are calculated for each digitised signal and the two sets of arrival time and intensity data are then combined to form a high dynamic range spectrum.

An embodiment of the present invention will now be described with reference to FIG. 2. As shown in FIG. 2, according to the preferred embodiment a single transient signal output from the ion detector is preferably converted into two transient signals. The first transient signal is preferably amplified by or with a first voltage gain A and the second transient signal is preferably amplified by or with a second voltage gain of B. According to the preferred embodiment the first voltage gain A is preferably greater than the second voltage gain B (i.e. A>B). Alternatively, the second voltage gain B may be greater than the first voltage gain A. The two transient signals are then preferably digitised using two Analogue to Digital Converters. By way of example only, if two 8 bit Analogue to Digital Converters are used and if the amplifier with the highest gain (A) is chosen such that on average a single ion arrival results in a digitised signal that is 10 bits high, then the lower gain (B) may be set 25 times lower.

The two resulting digitised transients are then preferably processed to determine the arrival time (or mass or mass to charge ratio) and intensity of all detected ion arrival events. As a result, two lists of ion arrival times (or mass or mass to charge ratio) and corresponding intensity values are produced. According to the preferred embodiment this preferably involves an event detection step to identify regions relating to ion arrival events followed by a centroid measurement of the arrival time (or mass or mass to charge ratio) and corresponding intensity. Other methods of ion arrival event measurement and evaluation may be employed.

According to an embodiment during the process of calculating or determining ion arrival times (or masses or mass to charge ratios) and determining the corresponding intensity, each of the high gain transient digitised samples in the region of an ion arrival event being processed is preferably checked to see whether the Analogue to Digital Converter is suffering from saturation. For example, for an 8 bit Analogue to Digital Converter the output may be checked for values equal to 255. If the result of this check is TRUE, then the arrival time (or mass or mass to charge ratio) and corresponding intensity values for this event are preferably marked or tagged (by setting a bit associated with the registered event). The result is, in this example, two lists of events with high gain transient events that have saturated data embedded within them being tagged or flagged. According to the preferred embodiment ion arrival events which have been recorded wherein the Analogue to Digital Converter suffers from saturation are preferably identified and replaced with the corresponding event or events as recorded in the low gain transient list by scaling the intensity by the appropriate gain ratio A/B (or B/A). There may be more than one event in the low gain data which corresponds to a single saturated event in the high gain data. The preferred embodiment preferably results in a list of arrival time (or mass or mass to charge ratio) and intensity pairs having a higher dynamic range than either of the two original arrival time (or mass or mass to charge ratio) and intensity pair lists.

According to the preferred embodiment the high dynamic range list may be combined with corresponding lists or data obtained from previous transients using a known method. Other less preferred methods of combining the transient signal event data may be employed. For example, a histogram approach may be employed. An advantage of applying a conventional combine method is that it is relatively simple to apply a time offset that is a fraction of the digitisation-step time to the arrival times accounting for any trigger time differences between the two Analogue to Digital Converters. Such trigger time differences may be caused by differences in propagation times.

Other methods of converting the output of an ion arrival event at the detector into two or more signals with different gains may be used. For example, in the case of a discrete dynode, detector signals may be monitored at more than one point in a dynode chain or in the case of a detector employing a dynode strip the signal may be monitored at various positions or locations along the dynode strip.

Figure 3:
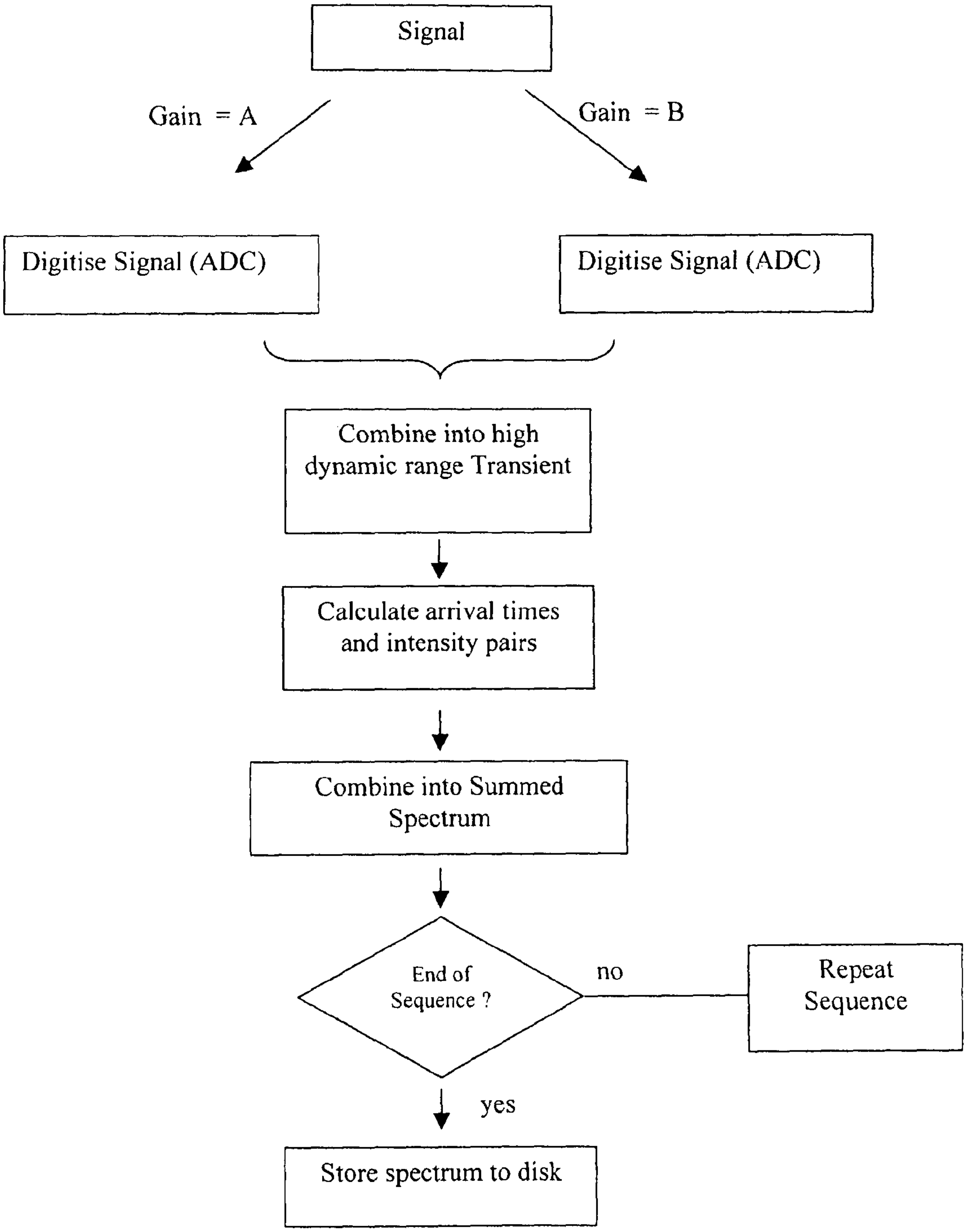
FIG. 3 shows a flow diagram illustrating a less preferred embodiment wherein two digitised signals are first combined to form a single transient and then time and intensity pairs are calculated for the single transient.

A less preferred embodiment of the present invention is shown in FIG. 3. According to this embodiment the signal from the ion detector is preferably split and amplified according to the method described above. After digitisation, the two transients are preferably combined to form a single high dynamic range transient. The high dynamic range transient is then preferably processed in order to produce a single list of events comprising arrival time (or mass or mass to charge ratio) and intensity pairs. The list of arrival time (or mass or mass to charge ratio) and intensity pairs is then preferably combined with other corresponding transient data as described above to form a summed spectrum.

Figure 4:
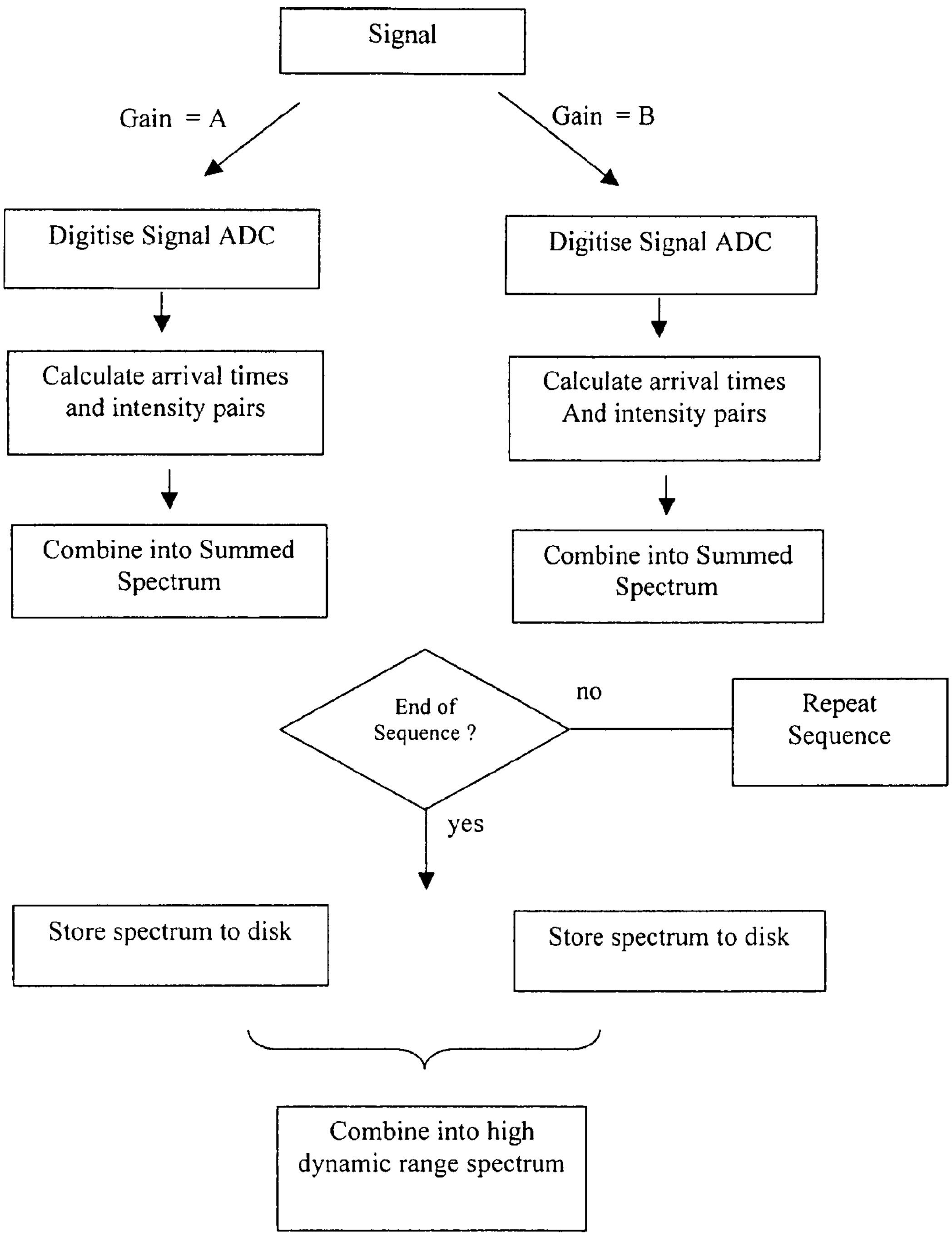
FIG. 4 shows a flow diagram illustrating an embodiment wherein first sets of arrival time and intensity pairs are summed to form a first summed spectrum and second sets of arrival time and intensity pairs are summed to form a second summed spectrum and wherein the first summed spectrum is then combined with the second summed spectrum.

FIG. 4 shows another embodiment of the present invention. According to this embodiment, the two transient data streams are preferably kept separate throughout the process and are both preferably written to disk on a scan by scan basis. A high dynamic range spectrum is then preferably constructed by combining the two transient data streams as a post processing operation. This method has the slight disadvantage that the potential of high speed parallel processing which is potentially afforded by fast Field-Programmable Gate Array (FPGA) devices is not fully utilised.

Figure 5:
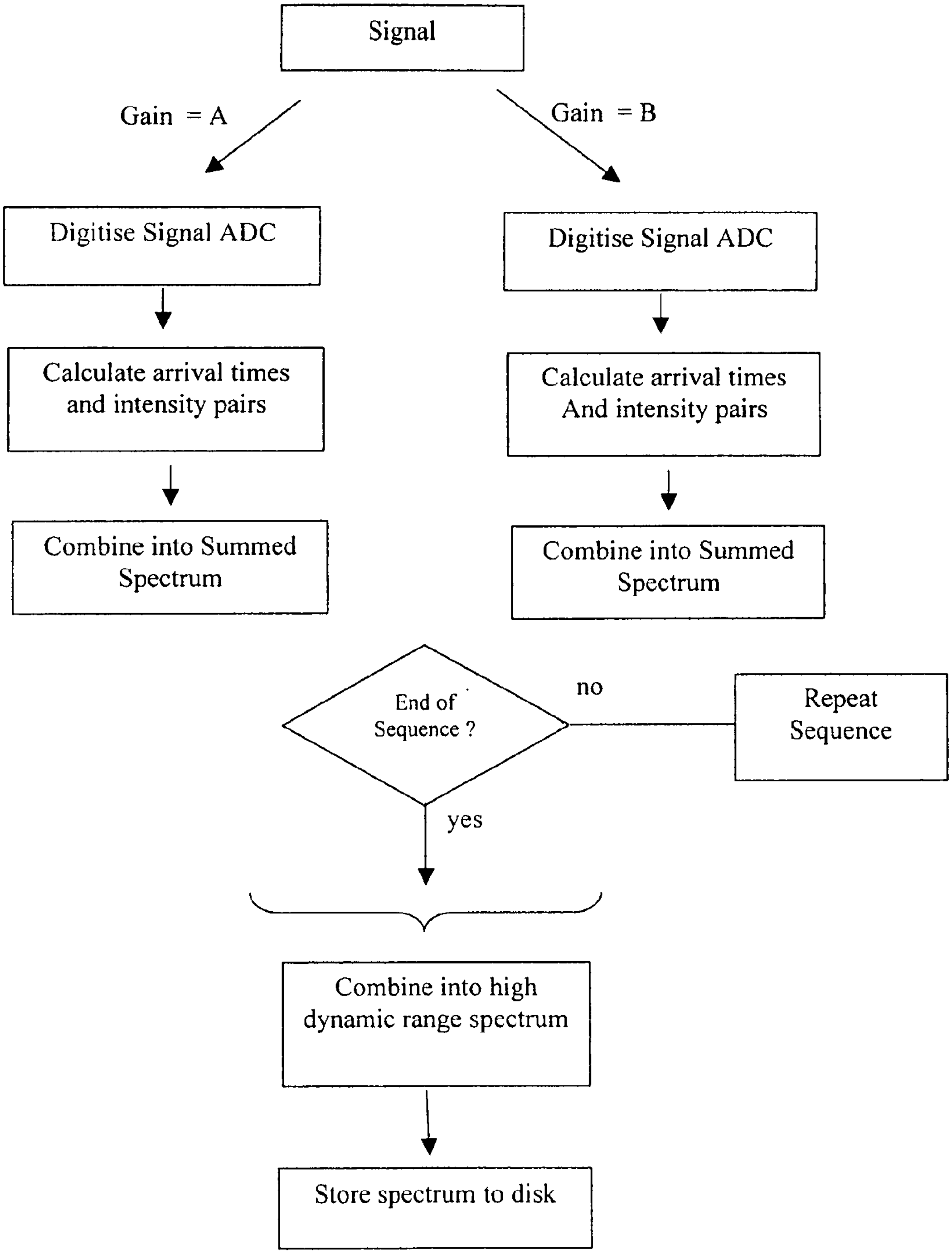
FIG. 5 shows a flow diagram illustrating an embodiment wherein a first summed spectrum is combined with a second summed spectrum to form a high dynamic range spectrum.

FIG. 5 shows a more preferred embodiment which more fully utilises the fast processing capabilities of Field-Programmable Gate Array devices. According to this embodiment an improvement in performance relative to the embodiment described above with reference to FIG. 4 is preferably observable. However, both methods have the slight disadvantage that it may be difficult to determine at what point saturation effects occur. For example, a detector signal may be processed that changes from a low ion arrival rate for the first half of an integration period or scan to a high ion arrival rate (thereby saturating the Analogue to Digital Converter) for the remainder. Examination just of the average ion arrival rate may suggest that the high gain data does not suffer from saturation effects whereas in fact the high gain data may suffer from saturation effects and will result in corrupted data. This is not the case according to the preferred embodiment as described above with relation to FIG. 2 whereby each transient is preferably tested for saturation to avoid corrupting the output spectrum. However, both of these methods have the advantage over the less preferred embodiment described above in relation to FIG. 3 in that any differences between the Analogue to Digital Converter trigger times can be corrected for.

Figure 6:
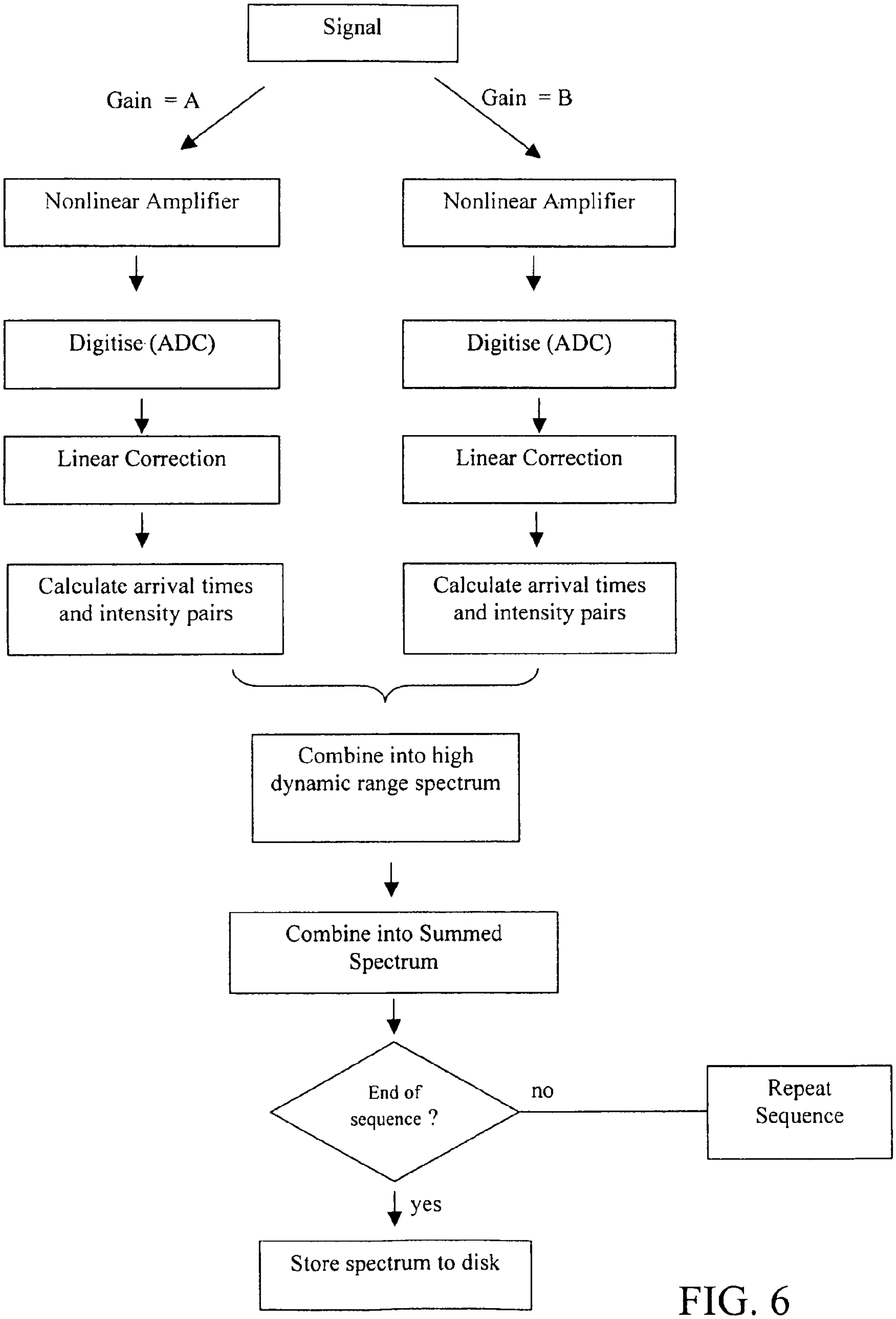
FIG. 6 shows a flow diagram illustrating an embodiment wherein a signal output from an ion detector is divided into two signals which are amplified by different gains and wherein two non-linear amplifier stages are provided prior to digitisation and wherein a non-linear conversion process is provided immediately after the digitisation stage.

A modification of the preferred embodiment described above with reference to FIG. 2 is shown in FIG. 6. According to this embodiment one or more non-linear analogue or amplifier processing stages are preferably provided prior to digitisation. The gain associated with these stages may, for example, comprise an intensity dependent gain (e.g. as in a logarithmic amplifier) or an intensity switched gain. For example, the gain may reduce when the input signal exceeds a given threshold value and may increase when the signal falls below a given value. The gain switch may be registered by a processing Field-Programmable Gate Array. After digitisation, the changes induced by the non-linear stages are preferably reversed. For example, in the case of a logarithmic amplifier the antilog of the digitised transient may be calculated. In the switched gain example the digitised transient may be multiplied or divided by an appropriate factor when the gain was determined to switch. A person skilled in the art may construct other advantageous non-linear analogue blocks.

Further embodiments of the present invention are contemplated wherein non-linear amplifiers as described above with reference to FIG. 6 may also be incorporated in the various embodiments as described above with reference to FIGS. 2-5.

Reversing the gain changes imposed by non-linear amplification prior to combining individual transient signals has advantages over performing this operation on the final spectrum produced at the end of a scan period particularly for situations where the average ion arrival rate changes during the scan period as previously described.

Although the embodiments shown and described above with reference to FIGS. 2-6 show two separate amplifiers and digitising Analogue to Digital Converters other embodiments are contemplated wherein three, four, or more than four separate amplifiers and digitising Analogue to Digital Converters may be provided.

Although the present invention has been described with reference to preferred embodiments, it will be understood by those skilled in the art that various changes in form and detail may be made without departing from the scope of the invention as set forth in the accompanying claims.

The invention claimed is:

1. A method of detecting ions comprising:
- outputting a first signal and a second signal from an ion detector, wherein said first signal corresponds with a signal multiplied or amplified by a first gain and said second signal corresponds with a signal multiplied or amplified by a second different gain;
- digitising said first signal to produce a first digitised signal and digitising said second signal to produce a second digitised signal;
- determining first intensity and arrival time, mass or mass to charge ratio data from said first digitised signal;
- determining second intensity and arrival time, mass or mass to charge ratio data from said second digitised signal; and
- combining said first intensity and arrival time, mass or mass to charge ratio data and said second intensity and arrival time, mass or mass to charge ratio data to form a combined data set.

2. A method as claimed in claim 1, further comprising processing said first digitised signal to detect a first set of peaks or ion arrival events and processing said second digitised signal to detect a second set of peaks or ion arrival events.

3. A method as claimed in claim 2, wherein:
- (a) said step of determining said first intensity and arrival time, mass or mass to charge ratio data from said first digitised signal further comprises determining first intensity and arrival time, mass or mass to charge ratio data for each or at least some peaks or ion arrival events in said first set of peaks or ion arrival events; and
- (b) said step of determining said second intensity and arrival time, mass or mass to charge ratio data from said second digitised signal further comprises determining second intensity and arrival time, mass or mass to charge ratio data for each or at least some peaks or ion arrival events in said second set of peaks or ion arrival events.

4. A method as claimed in claim 3, wherein:
- (a) said step of determining said first intensity and arrival time, mass or mass to charge ratio data further comprises marking or flagging each peak or ion arrival event in said first set of peaks or ion arrival events when the maximum digitised signal within a peak or ion arrival event is determined as equaling or approaching a maximum or full scale digitised output or is otherwise saturated or approaching saturation; or
- (b) said step of determining said second intensity and arrival time, mass or mass to charge ratio data further comprises marking or flagging each peak or ion arrival event in said second set of peaks or ion arrival events when the maximum digitised signal within a peak or ion arrival event is determined as equaling or approaching a maximum or full scale digitised output or is otherwise saturated or approaching saturation.

5. A method as claimed in claim 2, wherein said step of combining said first intensity and arrival time, mass or mass to charge ratio data and said second intensity and arrival time, mass or mass to charge ratio data further comprises:
- (a) selecting peak intensity and arrival time, mass or mass to charge ratio data from said second set of peaks or ion arrival events for each or at least some peaks or ion arrival events which are not marked or flagged or otherwise indicated as suffering from or approaching saturation; or
- (b) selecting peak intensity and arrival time, mass or mass to charge ratio data from said first set of peaks or ion arrival events when the nearest peak or a close peak or an ion arrival event having the nearest or a close arrival time in said second set of peaks or ion arrival events is marked or flagged or otherwise indicated as suffering from or approaching saturation.

6. A method as claimed in claim 5, further comprising scaling said peaks or ion arrival events selected from said first set of peaks or ion arrival events by a scale factor.

7. A method as claimed in claim 6, wherein said scale factor corresponds with, is close to or is otherwise related to the ratio of said second gain to said first gain.

8. A method as claimed in claim 1, further comprising summing said combined data set with a plurality of other corresponding combined data sets to form a final spectrum.

9. A method as claimed in claim 1, further comprising either:
- (a) applying a linear correction to said first digitised signal and applying a linear correction to said second digitised signal; or
- (b) applying a linear correction to said first digitised signal prior to said step of determining first intensity and arrival time, mass or mass to charge ratio data from said first digitised signal and applying a linear correction to said second digitised signal prior to said step of determining second intensity and arrival time, mass or mass to charge ratio data from said second digitised signal.

10. A method as claimed in claim 1, wherein said step of outputting said first signal and said second signal comprises converting, splitting or dividing a signal output from an ion detector into said first signal and said second signal, or wherein said step of outputting said first signal and said second signal comprises monitoring or outputting the signal from an ion detector at least two different positions or locations in or along one or more dynodes or other part of an ion detector.

11. A method as claimed in claim 1, wherein either:
- (a) said first gain is substantially greater than said second gain; or
- (a) said second gain is substantially greater than said first gain.

12. A method as claimed in claim 1, wherein said step of digitising said first signal comprises using a first Analogue to Digital Converter and said step of digitising said second signal comprises using a second Analogue to Digital Converter.

13. A method as claimed in claim 1, further comprising flagging data in said first digitised signal or said second digitised signal which is determined as corresponding to data which was obtained when an ion detector was saturated or nearing saturation.

14. A method as claimed in claim 1, further comprising either:

(a) replacing at least part of said first digitised signal with at least part of said second digitised signal if it is determined that at least part of said first digitised signal suffers from saturation effects; or (b) replacing at least part of said second digitised signal with at least part of said first digitised signal if it is determined that at least part of said second digitised signal suffers from saturation effects.

15. An ion detector system comprising:

a device arranged and adapted to output a first signal and a second signal from an ion detector, wherein said first signal corresponds with a signal multiplied or amplified by a first gain and said second signal corresponds with a signal multiplied or amplified by a second different gain;

a device arranged and adapted to digitise said first signal to produce a first digitised signal and a device arranged and adapted to digitise said second signal to produce a second digitised signal;

a device arranged and adapted to determine first intensity and arrival time, mass or mass to charge ratio data from said first digitised signal;

a device arranged and adapted to determine second intensity and arrival time, mass or mass to charge ratio data from said second digitised signal; and a device arranged and adapted to combine said first intensity and arrival time, mass or mass to charge ratio data and said second intensity and arrival time, mass or mass to charge ratio data to form a combined data set.

* * * * *